United States Patent [19]

Schafer et al.

[11] 3,900,223

[45] Aug. 19, 1975

[54] PIPE COUPLING

[75] Inventors: James D. Schafer, Rockford, Ill.; Frederic W. Pollman, Ames, Iowa

[73] Assignee: Sundstrand Corporation, Rockford, Ill.

[22] Filed: Jan. 23, 1974

[21] Appl. No.: 435,894

[52] U.S. Cl. ............................ 285/4; 285/351
[51] Int. Cl. ............................ F16l 35/00
[58] Field of Search ............ 285/3, 4, 351, DIG. 18; 137/68, 797

[56] References Cited
UNITED STATES PATENTS

| | | | |
|---|---|---|---|
| 3,201,148 | 8/1965 | Shurtleff | 285/3 |
| 3,202,442 | 8/1965 | Abbey et al. | 285/3 |
| 3,285,627 | 11/1966 | Kozulla et al. | 285/3 |

*Primary Examiner*—Dave W. Arola
*Attorney, Agent, or Firm*—Wegner, Stellman, McCord, Wiles & Wood

[57] ABSTRACT

A coupling for connecting two sealed conduits as in an air-conditioning system. A male member has a body with an outer sleeve closed by a diaphragm and a flow passage therethrough defined in part by a tube inside the body. A female coupling member has a body with a flow passage therethrough the end of which is closed by a diaphragm. As the parts are drawn together the end of the female member enters the outer sleeve of the male member rupturing the diaphragm and subsequently the end of the tube in the male member engages and ruptures the diaphragm across the end of the female member. The parts of the diaphragm are forced back out of the flow passage. A metal-to-metal seal between the tube and the female body member completes the flow passage and a resilient seal between the outer sleeve of the male member and the outside of the female member keeps moisture from the metal-to-metal joint.

9 Claims, 7 Drawing Figures

PIPE COUPLING

This invention is concerned with a coupling for connecting sealed conduits which are a part of a system containing a fluid, without allowing the fluid to escape or ambient fluid to enter. More particularly, in the refrigeration field, it is common to provide sealed units which are components of the system and which are charged with a refrigeration fluid under pressure. During installation of a system, the conduits between units must be connected without losing refrigerant or allowing a contaminant, as moisture, to enter.

A rubber or other elastomeric seal permits leakage of refrigerant. Accordingly, it is common to use a coupling in which the seal for the flow passage is provided between metal surfaces, as, for example, aluminum or brass. If dissimilar metals form the seal and are exposed to moisture, galvanic action causes corrosion and a leak may develop. Very often couplings of different metals must be connected in making an installation as both aluminum and brass are used and it is not always possible to select units with couplings of the same material.

The couplings which have previously been available have shortcomings which are solved in the coupling of the invention. Shurtleff U.S. Pat. No. 3,201,148 relies on a single sealing gasket 18 which, if of an elastomer, will leak the refrigerant, and if of a metallic material, is subject to corrosion if exposed to moisture. Abbey U.S. Pat. No. 3,202,442 has a metal-to-metal seal which is outside a resilient sealing ring and is subject to corrosion. Furthermore, Abbey relies on a cutting element to rupture the diaphragms and which obstructs the flow of refrigerant through the coupling. Bredtschneider U.S. Pat. No. 2,933,333 similarly has a cutting element for the diaphragms and relies on a gasket and O-ring for sealing. Markle U.S. Pat. No. 1,933,117 illustrates a coupling between a single closed system and an extension pipe, as in a natural gas distribution system.

One feature of the coupling of the present invention is that is affords an internal metal-to-metal seal of the flow passage and provides an outer resilient seal between the coupling members which keeps moisture away from the metal-to-metal seal.

Another feature is that the diaphragms which close the two couplings are ruptured sequentially, minimizing the force which is required to assemble the coupling.

A further feature is that the diaphragms are ruptured by engagement with an opposing annular member which applies a force around the periphery of the diaphragm, avoiding the use of a cutting element.

Yet another feature is that the parts of the coupling are spaced so that the ruptured diaphragm sectors are forced back out of the flow passage and the passage is not obstructed.

Further features and advantages of the invention will readily be apparent from the following specification and from the drawings, in which.

Figure 1:
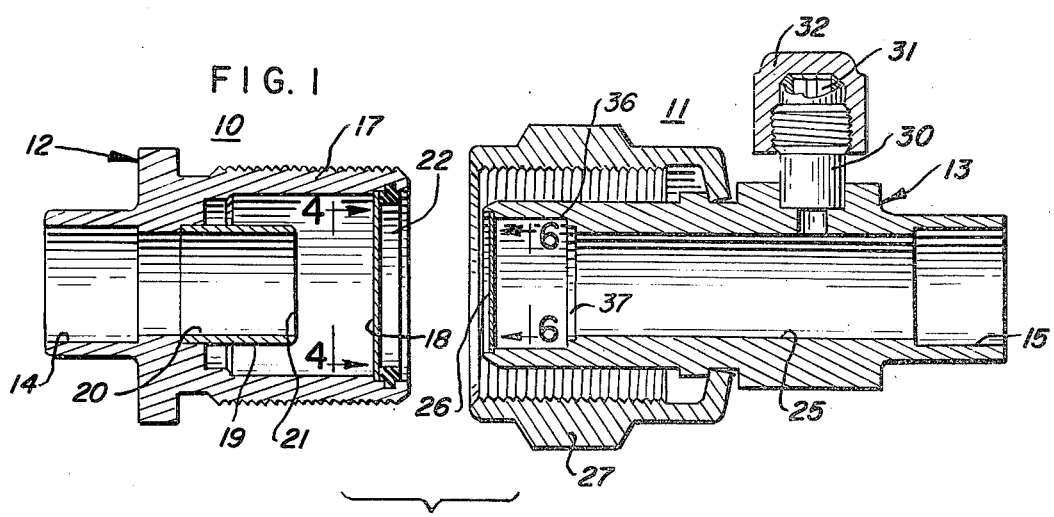
FIG. 1 is a longitudinal section of the members of the coupling prior to their engagement.
Figure 2:
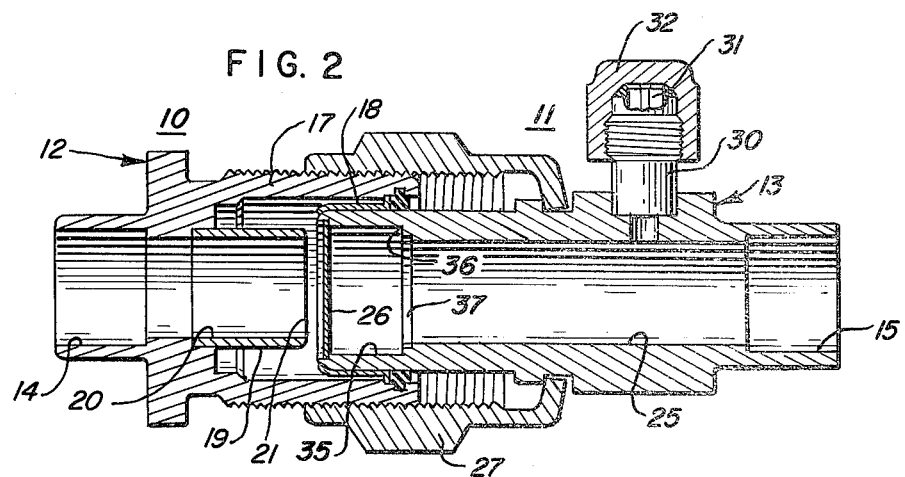
FIG. 2 is a view similar to FIG. 1 with the members of the coupling partially engaged.
Figure 3:
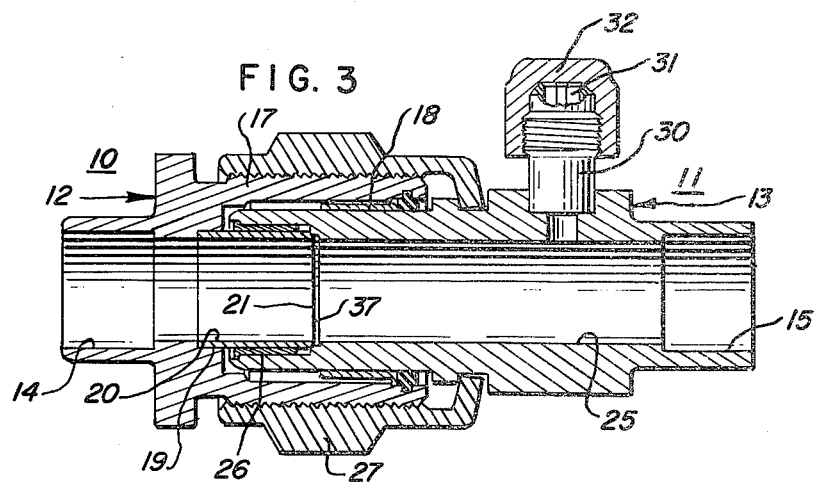
FIG. 3 is a view similar to FIG. 1 with the members of the coupling fully engaged.
Figure 6:
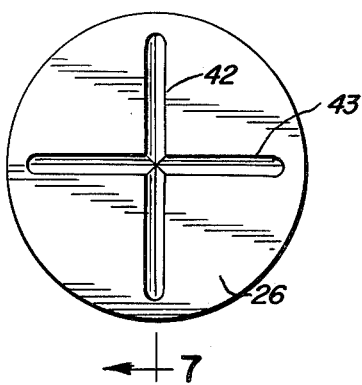
FIG. 6 is an elevation of the diaphragm in the female coupling member taken along line 6—6 of FIG. 1.
Figure 7:
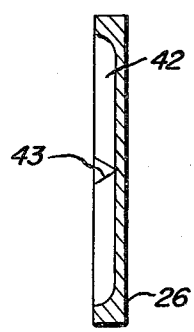
FIG. 7 is a section through the diaphragm of FIG. 6 taken along line 7—7.
Figure 5:
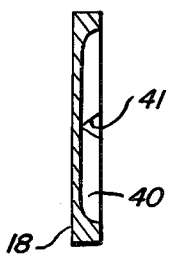
FIG. 5 is a section through the diaphragm of FIG. 4 taken along line 5—5.
Figure 4:
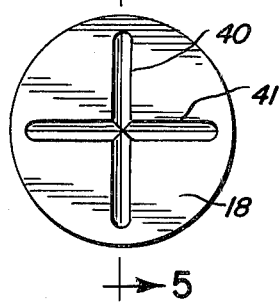
FIG. 4 is an elevation of the diaphragm in the male coupling member taken along line 4—4 of FIG. 1.

The coupling, FIGS. 1, 2 and 3, includes a male member 10 and a female member 11, each having a body 12, 13 respectively, with sockets 14, 15 in which conduits, not shown, are secured. The conduits may, for example, be metal tubing of a unit of a refrigeration system.

The body 12 of male member 10 has an outer sleeve portion 17 which is externally threaded. A diaphragm 18 is seated on a shoulder in the inner wall of the outer sleeve portion and may be soldered or brazed in place to seal the unit. An inner tube 19 is mounted in body 12 and defines a section of the flow passage 20. The end surface 21 of tube 19 is spaced inwardly from diaphragm 18. A resilient gasket 22 is positioned inside the outer sleeve member 17, immediately outside diaphragm 18. A rib on the outer periphery of gasket 22 is seated in a groove on the inner wall of the sleeve.

The body 13 of female coupling member 11 has a flow passage 25 therethrough. The flow passage is closed by a diaphragm 26, seated on a shoulder in the inner wall of the body, and suitably secured in place. A union nut 27 is rotatably mounted on body 13 and has internal threads which are engageable with the external threads of the sleeve portion 17 of the male coupling member to draw the members together. A charging port 30 extends outwardly from the wall of female body 13 and has a valve 31. The refrigeration unit, not shown, to which the coupling member is connected may be charged with refrigerant through valve 31. A protective cap 32 is mounted on the nipple 30.

The threads of the union nut 27 are engageable with the external threads of the outer sleeve 17 to draw the two coupling members together, rupturing diaphragms 18 and 26 and completing a sealed flow passage for the refrigerant or other fluid in the systems being connected. The threaded inner surface of the union nut 27 extends forwardly beyond the end of female body member 13, to engage the threads of the sleeve portion 17 of the male body member before the end of the female body member engages diaphragm 18. Upon initial connection of the coupling members, the female body member 13 enters resilient sealing ring 22 and the end of the body engages diaphragm 18. The cylindrical end of the female body 13 applies hoop tension to the diaphragm causing it to rupture. As the female body member advances into the outer sleeve portion 17 of the male member, the pieces of the diaphragm are forced outwardly, FIG. 2. The inner diameter of sleeve portion 17 is greater than the outer diameter of the end of the female body member affording a space for the pieces of the diaphragm so that they do not obstruct the flow passage.

Following rupture of the diaphragm 18, the end 21 of the tube 19 in the male member engages diaphragm 26, similarly applying hoop tension and rupturing the diaphragm as the parts are drawn together. The flow passage 25 through female body member 13 has an inner diameter which is the same as that of the flow passage 20 through tube 19. The end of the passage, into which the tube enters upon rupturing diaphragm 26 is counterbored at 35 to an inner diameter greater than the outer diameter of tube 19 affording a space within which the sectors of ruptured diaphragm 26 are accommodated. The end 21 of tube 19 has a rounded outer edge which engages an inwardly presented edge between a radial shoulder 36 and an axial wall 37 of the female body member to form the metal-to-metal seal between the coupling members, FIG. 3.

The diaphragms 18, 26, FIGS. 4–7, are circular metal discs, as of aluminum or brass. Each has a pair of diametric scores extending at right angles across one face to facilitate rupture of the diaphragm by the application of hoop tension. More particularly, the diaphragm 18 for the male member has scores 40, 41 and the diaphragm 26 of the female member has scores 42, 43. The diaphragms are mounted on the respective coupling members with the scores inwardly presented, facing the internal pressure of the fluid in the units to which the coupling members are connected. A scored disc presents greater resistance to deformation from pressure applied to the scored surface than to the unscored surface. In connecting the coupling members, hoop tension is applied to the face of the diaphragms opposite the scores, tending to stretch the diaphragm surface. This causes a rupture along both score lines dividing the diaphragm into four sectors which are forced back as the coupling members move together.

The scores on the diaphragms have the effect of weakening the diaphragms with respect to the hoop tension applied to rupture them, to a greater extent than they are weakened with respect to the fluid pressure applied to the opposite surface. The seal provided by the diaphragm is sufficiently strong to contain the fluid pressure, without the need for additional safety caps, yet does not require excessive pressure to assemble the coupling.

In the assembly of the coupling, diaphragms 18 and 26 rupture at different positions of the parts. The force required to assemble the coupling is thus only that necessary to achieve rupture of one diaphragm.

The axial spacing between the edge 21 of tube 19 and diaphragm 18 is so related to the diameter of sleeve 17 that the sectors of diaphragm 18 are forced back without interference from the tube. Similarly, the shoulder 36 in the female body 13 is spaced from diaphragm 26 a sufficient distance that the sectors of the diaphragm are forced back before the end 21 of tube 19 seats. On completion of the joining of the coupling members, both diaphragms are folded back out of the way and the installer can determine when initial metal-to-metal contact occurs between the end 21 of tube 19 and the shoulder in the wall of female member 13. One additional turn of union nut 27 seats the end of the tube on the shoulder, forming the metal-to-metal seal.

We claim:

1. A coupling for connecting conduits, comprising:
a male member having a body with a flow passage therethrough and an outer cylindrical sleeve portion;
a diaphragm across the end of said sleeve portion, closing the flow passage;
a cylindrical tube inside said body defining a part of the flow passage, spaced inwardly from and concentric with the outer sleeve portion and having an end which is spaced inwardly of said diaphragm;
a female member having a cylindrical body with a flow passage therethrough;
a diaphragm on the end of the female body member closing the flow passage; and
means for drawing the male and female body members together in coaxial relation, the end of the female body member engaging and rupturing the diaphragm over the end of the male body member and thereafter the end of the tube inside the sleeve of the male member engaging and rupturing the diaphragm over the end of the female member, establishing unobstructed communication between the flow passages, the ends of the cylindrical tube and the female body member and both diaphragms being in planes normal to the coupling axis whereby the tube and body member ends engage the respective diaphragms to apply hoop tension thereto.

2. The coupling of claim 1 in which the inner surface of the sleeve portion of the male body member has a diameter greater than the diameter of the outer surface of the female body member and the inner surface of the female body member has a diameter greater than the diameter of the outer surface of the tube inside the male body member, the sleeve portion and the tube telescoping outside and inside the female body member respectively on connection of the coupling members and the outer surfaces being spaced from the inner surfaces to accommodate the ruptured diaphragms therebetween.

3. The coupling of claim 2 in which each diaphragm has a pair of diametric scores on the inner surface thereof, at right angles to each other, the diaphragm rupturing in four sectors along the scores.

4. The coupling of claim 2 in which the end of the cylindrical tube is spaced inwardly from the diaphragm across the end of the sleeve a distance sufficient to permit the ruptured diaphragm to fold outwardly into the space between the outer surface of the female body member and the inner surface of the sleeve portion of the male body member without interference with the tube.

5. The coupling of claim 4 in which the female body member has an internal shoulder spaced inwardly from the diaphragm on the end of the female body member and against which the end of said tube seats to form a seal, the spacing of the shoulder from the female body member diaphragm being sufficient to permit the ruptured diaphragm to fold outwardly into the space between the inner surface of the female body member and the outer surface of the tube without interference with said shoulder.

6. A coupling for connecting conduits in a refrigeration system, comprising:
a male member having a flow passage therethrough;
a diaphragm closing said flow passage;
a metal tube defining a part of the flow passage in said male member and having an end with a metal sealing surface;
a female member having a body with a flow passage therethrough and a complementary metal sealing surface therein;
a diaphragm on the end of the female body member closing the flow passage,
means for drawing the male and female body members together in telescoped coaxial relation, rupturing said diaphragms and bringing said metal sealing surfaces into sealing engagement with each other providing a continuous refrigerant flow passage; and
a resilient moistureproof seal between the telescoped surfaces of the male and female body members, sealing with each in a plane generally at right angles to the axis of the coupling, said metal-to-metal seal being between the refrigerant flow passage and said resilient moistureproof seal.

7. The coupling of claim 6 in which said male member has an outer cylindrical sleeve portion which surrounds the female body member, said resilient moistureproof seal being located between the inner surface of said sleeve portion and the outer surface of said female body member.

8. The coupling of claim 7 in which the diaphragm closing the flow passage of the male member is carried across the end of said sleeve portion and said moistureproof seal is carried on the inner surface of said sleeve, outside said diaphragm and is engaged by the outer surface of the female body member as the female body member engages the diaphragm.

9. The coupling of claim 6 in which said metal-to-metal seal is formed between a rounded outer edge at the end of the tube of the male body member and an inwardly presented edge between a radial shoulder and an axial wall of the female body member.

* * * * *